(12) United States Patent
Cochard

(10) Patent No.: US 7,946,647 B2
(45) Date of Patent: May 24, 2011

(54) DEVICE FOR COVERING A RECESS FORMED IN A COVERING STRIP

(75) Inventor: Mathieu Cochard, La Tronche (FR)

(73) Assignee: A. Raymond et Cie, Grenoble (FR)

( * ) Notice: Subject to any disclaimer, the term of this patent is extended or adjusted under 35 U.S.C. 154(b) by 233 days.

(21) Appl. No.: 12/087,612

(22) PCT Filed: Nov. 8, 2006

(86) PCT No.: PCT/EP2006/010689
§ 371 (c)(1),
(2), (4) Date: Nov. 19, 2008

(87) PCT Pub. No.: WO2007/087844
PCT Pub. Date: Aug. 9, 2007

(65) Prior Publication Data
US 2009/0160219 A1    Jun. 25, 2009

(30) Foreign Application Priority Data
Jan. 13, 2006  (DE) .................. 10 2006 001 742

(51) Int. Cl.
*B62D 25/00* (2006.01)
(52) U.S. Cl. ...................................................... 296/210
(58) Field of Classification Search .............. 296/37.1, 296/37.8, 37.9, 37.12, 37.13, 37.7, 210
See application file for complete search history.

(56) References Cited

U.S. PATENT DOCUMENTS

| 5,702,144 A | * | 12/1997 | Matsuura et al. | .......... 296/37.13 |
| 5,707,101 A | * | 1/1998 | Rice | .................. 296/37.8 |
| 5,746,466 A | * | 5/1998 | Antos et al. | .......... 296/37.1 |

FOREIGN PATENT DOCUMENTS

| DE | 19745756 A1 | 4/1999 |
| DE | 29906207 U1 | 8/1999 |
| DE | 19840294 A1 | 3/2000 |
| EP | 0968882 A1 | 1/2000 |

OTHER PUBLICATIONS

International Search Report PCT/EP2006/010689.

* cited by examiner

*Primary Examiner* — Lori L Lyjak
(74) *Attorney, Agent, or Firm* — Tarolli, Sundheim, Covell & Tummino LLP

(57) ABSTRACT

A device for covering a recess (4) formed in a covering strip (5) has a flap (3), which is rotatable about a longitudinal axis, and a bearing arrangement for holding the flap (3) in bearing regions on the end side. There are journals (15, 16) with resilient fork limbs (18, 19) on the end side, wherein at least one fork limb (18, 19) is designed with a latching lug (20) on the end side. Furthermore, bearing sleeves (7, 8) are formed which each have a journal-receiving space (9) which extends in the direction of the longitudinal axis of the flap (3) and into which a journal (15, 16) can be fitted until it engages behind an edge side of the bearing sleeve (7, 8) by way of a latching lug (20).

20 Claims, 3 Drawing Sheets

DEVICE FOR COVERING A RECESS FORMED IN A COVERING STRIP

TECHNICAL FIELD

The invention relates to a device for covering a recess formed in a covering strip.

BACKGROUND ART

A device of this type is known from DE 198 40 294 A1. This device for covering a recess formed in a covering strip for a vehicle roof has a flap, which is rotatable about a longitudinal axis, and a bearing arrangement for holding the flap in bearing regions on the end side. The bearing arrangement has two mirror-symmetrically formed bearing brackets, each formed with two web parts that are oriented transversely to the longitudinal direction of the flap. Each web part has a groove made in it, into which the journals of the flap can be fitted so that the bearing flap is held rotatably. The bearing brackets are connected with each other with relatively little outlay of material by means of a connecting part that extends over the longitudinal direction of the flap, so that after the journals of the flap are pressed into the grooves, the device can be handled as a unit.

The invention is based on the problem of suggesting a device of the type mentioned above that can be handled in a simple manner as a unit with relatively little outlay of material.

DISCLOSURE OF THE INVENTION

According to the invention, this problem is solved with a device of the type mentioned above.

In particular, the present invention provides a device for covering a recess formed in a covering strip, having a flap which is rotatable about a longitudinal axis and a bearing arrangement for holding the flap in bearing regions on the end side. According to the invention, the device includes journals with resilient fork limbs on the end side wherein at least one fork limb is designed with a latching lug on the end side. Bearing sleeves are formed that exhibit a journal receiving space which extends in the direction of the longitudinal axis of the flap and into which a journal can be fitted until it engages behind an edge side of the bearing sleeve by means of the latching lug.

In the inventive device, as a result of the fact that journals can be fitted into the bearing sleeves, which advantageously surround them essentially completely except for a certain residual gap, and the fact that the latching lugs engage behind the bearing sleeves on the edge side, the individual parts of the bearing arrangement, e.g., two bearing brackets that accommodate bearing sleeves, are connected with each other by the flap, so that the device can be handled as a unit, even if the bearing arrangement itself consists of two separate parts.

Additional advantageous developments and benefits are found in the following description of a preferred embodiment of the invention, including references to the Figures of the drawing. Shown are:

BEST MODE FOR CARRYING OUT THE INVENTION

Figure 1:
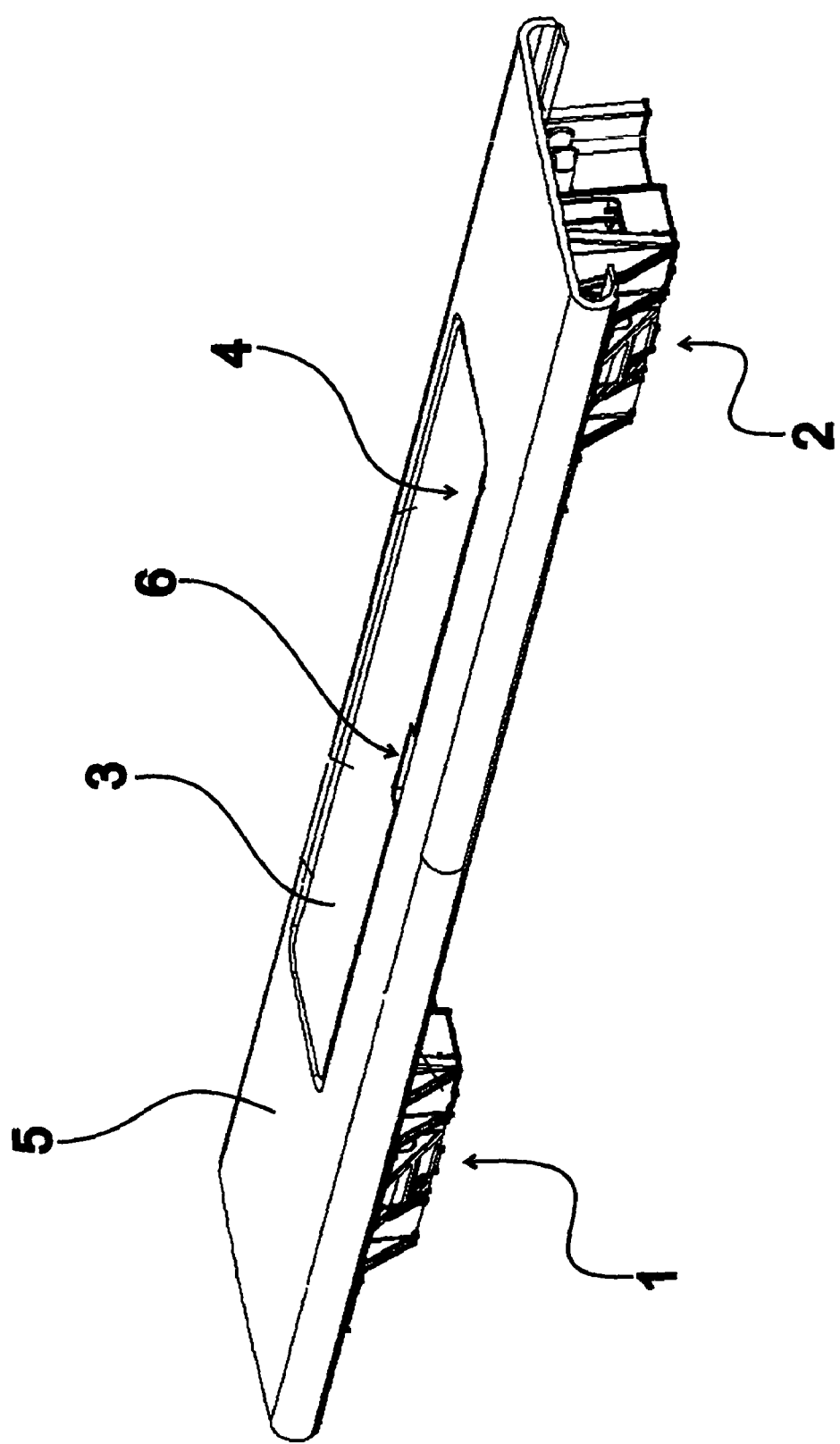
FIG. 1 A perspective view of an embodiment of an inventive device for covering a recess formed in a covering strip for a vehicle roof in an arrangement connected with the covering strip and with a closed position of the flap that closes the recess, FIG. 2 A perspective exploded view of the embodiment according to FIG. 1, with two identically designed and symmetrically configured bearing brackets for both right-handed installation as well as left-handed installation, and a flap in a deployed open position, and FIG. 3 An enlarged view of a bearing bracket of the embodiment according to FIG. 1 and FIG. 2.

FIG. 1 shows a perspective view of an embodiment of an inventive device, which has a bearing arrangement with two bearing brackets 1, 2 made of a hard elastic plastic, and a rotatable elongated flap 3, which is also made of a hard elastic plastic. The bearing brackets 1, 2 are constructed so that they can be fitted into a roof strip channel of a vehicle roof and be connected with a covering strip 5, which exhibits a recess 4 to be covered, of the vehicle roof. In the closed position of the flap 3 shown in FIG. 1, the recess 4 is closed flush, whereby a narrow engagement groove 6, e.g., for applying the blade of a screwdriver to lever open the flap 3 in order to make it easier to transfer the flap 3 into a deployed open position, is formed on an engagement side.

Figure 2:
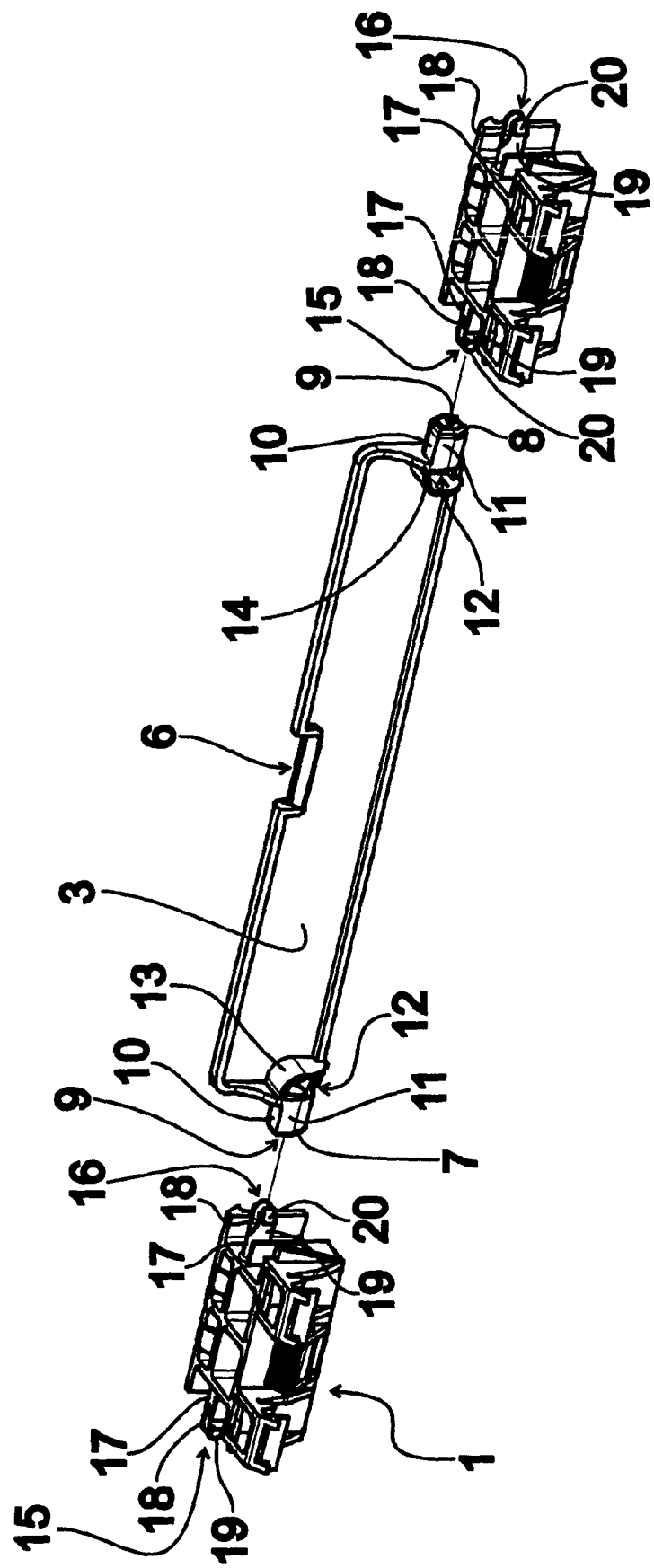

FIG. 2 shows a perspective exploded view of the embodiment according to FIG. 1, with the flap 3 in a deployed open position that is at a right angle to the closed position according to FIG. 1. It can be seen from FIG. 2 that circumferentially closed bearing sleeves 7, 8 are mounted on the flap 3 on the edge side of each face side and are flush with each other, each exhibiting a cylindrical journal-receiving space 9 that is open in the longitudinal direction on both sides. Each bearing sleeve 7, 8 has on the outside a first flat side 10 and a second flat side 11, which are oriented at right angles to each other, whereby the first flat sides 10 are arranged at a right angle to the top side of the flap 3 and the second flat sides 11 are arranged parallel to the top side of the flap 3. Formed on the flap 3 at both bearing sleeve 7, 8 face sides that are to point towards each other are bow-like protective webs 13, 14, each surrounding a lug-receiving space 12, which interrupt the direct connection between the bearing sleeves 7, 8 in the longitudinal direction.

It can also be seen in FIG. 2 that each bearing bracket 1, 2 is equipped with two journals 15, 16, which are arranged opposite each other, with their free ends pointing away from each other, and flush with each other in the longitudinal direction of the flap 3. Each journal 15, 16 exhibits a length that is somewhat smaller than the distance between the edge side, which points away from the flap 3, of bearing sleeve 7, 8 and a protective web 13, 14. Each journal 15, 16 has in addition an essentially cylindrical tying section 17 made of solid material, and resilient fork limbs 18, 19, which extend outward from the tying section 17 and away from the particular bearing bracket 1, 2, and which are both formed with a latching lug 20 that points outward radially. The outside diameter of the journals 15, 16 in the region of the tying sections 17 and the fork limbs 18, 19 essentially matches the inside diameter of the bearing sleeves 7, 8, whereby the distance between the end of the tying section 17 that points away from the fork limbs 18, 19 and the face side of a latching lug 20 essentially matches the length of a bearing sleeve 7, 8. In turn, the latching lugs 20 exhibit in the longitudinal direction a dimension that is smaller than the distance between the bearing sleeve 7, 8 face sides that are to point towards each other and the protective webs 13, 14.

Thus, the journals 15, 16 can be fitted into the bearing sleeves 7, 8 until the latching lugs 20 engage behind the bearing sleeve 7, 8 face sides that are to point towards each other, and the bearing brackets 1, 2 are thus connected with the flap 3. The protective webs 13, 14 offer the latching lugs 20 as well as the free ends of the fork limbs 18, 19 a certain protection against unintentional destruction in order to make the connection between the bearing brackets and the flap 3 as fail-safe as possible, even under the usually rough operating conditions of a motor vehicle.

Figure 3:
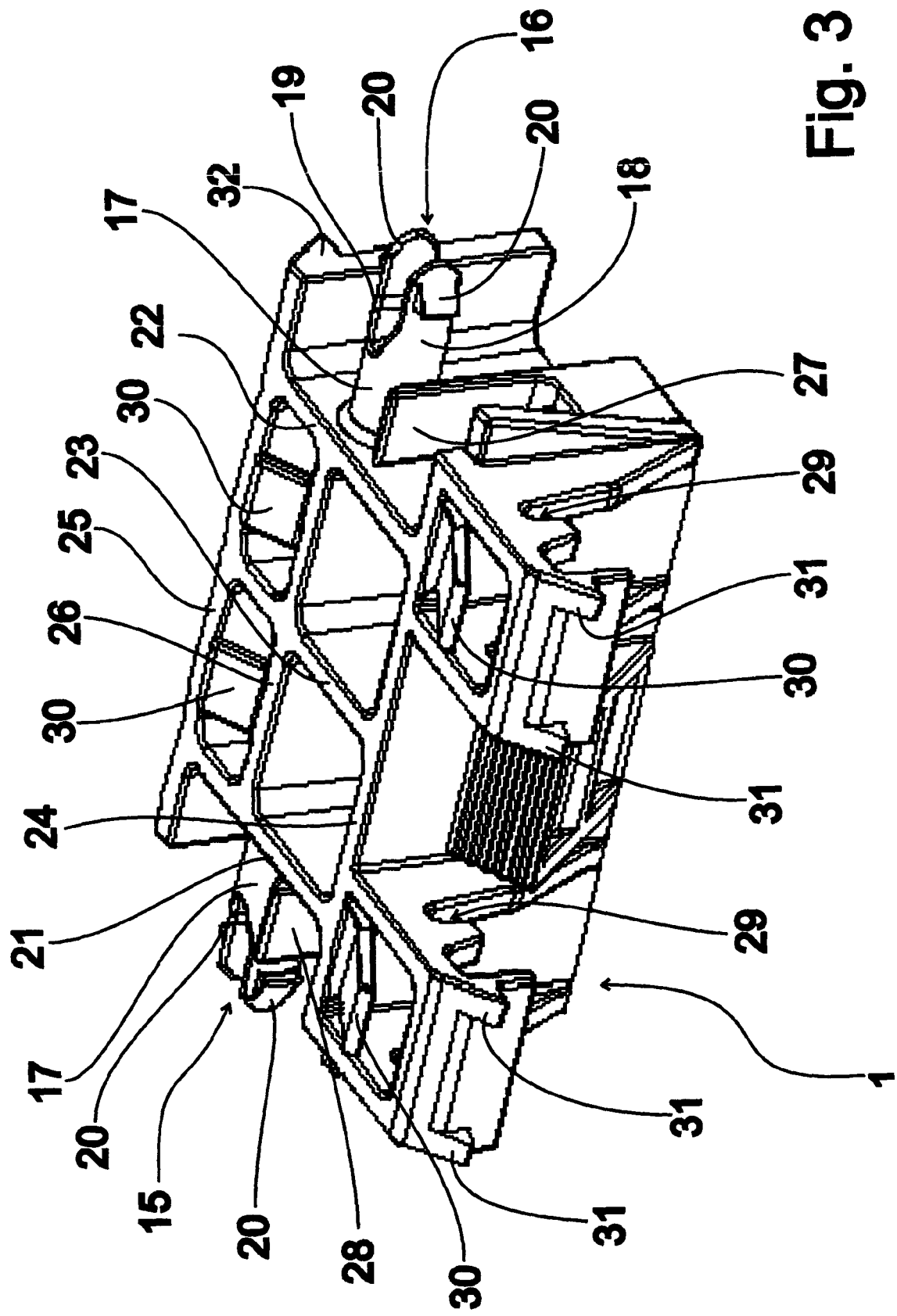

In a representation in a larger scale than that of FIG. 1 and FIG. 2, FIG. 3 shows one of the bearing brackets 1, 2 of the inventive device. It can be seen in FIG. 3 that the bearing brackets 1, 2 have as the basic structure a number of external and internal transverse webs 21, 22, 23, as well as external and internal longitudinal webs 24, 25, 26, which are oriented at right angles to each other, whereby the external transverse webs 21, 22 are displaced towards the inside to an extent such that a blade-like contact tongue 27, 28 is arranged between the journals 15, 16 and the longitudinal web 24, which protrudes externally. Each contact tongue 27, 28 exhibits a distance from their directly opposite journals 15, 16 that is oriented in such a way that the contact tongues 27, 28 lie with prestress against the flat sides 10, 11 of the bearing sleeves 7, 8, which are in engagement with the particular journals 15, 16, and thus hold the flap 3 in the closed position or the open position as the case may be, whereby as a result of the transition region formed between the flat sides 10, 11 with a larger radial distance to the center line of the bearing sleeves 7, 8, during the transition of the flap 3 between the open position and the closed position there is a transition resistance which must be overcome with an increased expenditure of force before a change of position of the flap 3 takes place.

It can also be seen from FIG. 3 that the bearing brackets 1, 2 have groove-like fastening-web receivers 29 for accommodating a fastening web connected with the vehicle roof, and also have tensioning tongues 30, which in the representation according to FIG. 3 protrude upward in the direction of a covering strip 5, to lie against a covering strip 5, which has edge lugs 31 and an edge lug strip 32 in the form of longitudinal side projections, and which is clippable, in order to ensure a secure fit of the covering strip 5 against the bearing brackets 1, 2 that is free of play and is secure against shocks.

Although the foregoing has been described in conjunction with a preferred embodiment, it is to be appreciated that various modifications may be made without departing from the spirit and scope of the invention as defined by the appended claims.

The invention claimed is:

1. Device for covering a recess (4) formed in a covering strip (5), having a flap (3), which is rotatable about a longitudinal axis, and a bearing arrangement for holding the flap (3) in bearing regions on the end side, characterized in that journals (15, 16) with resilient fork limbs (18, 19) on the end side, wherein at least one fork limb (18, 19) is designed with a latching lug (20) on the end side are present, and in that bearing sleeves (7, 8) are formed which each exhibit a journal-receiving space (9) which extends in the direction of the longitudinal axis of the flap (3) and into which a journal (15, 16) can be fitted until it engages behind an edge side of the bearing sleeve (7, 8) by means of a latching lug (20).

2. Device according to claim 1, characterized in that a latching lug (20) is formed on each fork limb (18, 19).

3. Device according to claim 1, characterized in that the journals (15, 16) are each formed on a bearing bracket (1, 2) of the bearing arrangement, and the bearing sleeves (7, 8) are formed on the flap (3).

4. Device according to claim 3, characterized in that the bearing sleeves (7, 8) protrude beyond the flap (3) on the end sides.

5. Device according to claim 3, characterized in that formed on at least one bearing sleeve (7, 8) on the outside are flat sides (10, 11), which are oriented at right angles to each other, and that the bearing brackets (1, 2) exhibit a resilient contact tongue (27, 28), which are arranged in the region of the bearing sleeves (7, 8) that are formed with flat sides (10, 11), and which lie with prestress against one of the flat sides (10, 11) in a position of the flap (3) that closes the recess (4), as well as in a deployed open position of the flap (3).

6. Device according to claim 3, characterized in that each bearing bracket (1, 2) exhibits two journals (15, 16) that are opposite each other and point away from each other.

7. Device according to claim 3, characterized in that formed on the flap (3) for each bearing sleeve (7, 8) is a protective web (13, 14), whereby the protective webs (13, 14) are arranged on the side of the particular bearing sleeve (7, 8) facing the exit side of the journals (15, 16) and surround the end of the journals (15, 16) at least in sections.

8. Device according to claim 2, characterized in that the journals (15, 16) are each formed on a bearing bracket (1, 2) of the bearing arrangement, and the bearing sleeves (7, 8) are formed on the flap (3).

9. Device according to claim 8, characterized in that the bearing sleeves (7, 8) protrude beyond the flap (3) on the end sides.

10. Device according to claim 4, characterized in that formed on at least one bearing sleeve (7, 8) on the outside are flat sides (10, 11), which are oriented at right angles to each other, and that the bearing brackets (1, 2) exhibit a resilient contact tongue (27, 28), which are arranged in the region of the bearing sleeves (7, 8) that are formed with flat sides (10, 11), and which lie with prestress against one of the flat sides (10, 11) in a position of the flap (3) that closes the recess (4), as well as in a deployed open position of the flap (3).

11. Device according to claim 8, characterized in that formed on at least one bearing sleeve (7, 8) on the outside are flat sides (10, 11), which are oriented at right angles to each other, and that the bearing brackets (1, 2) exhibit a resilient contact tongue (27, 28), which are arranged in the region of the bearing sleeves (7, 8) that are formed with flat sides (10, 11), and which lie with prestress against one of the flat sides (10, 11) in a position of the flap (3) that closes the recess (4), as well as in a deployed open position of the flap (3).

12. Device according to claim 9, characterized in that formed on at least one bearing sleeve (7, 8) on the outside are flat sides (10, 11), which are oriented at right angles to each other, and that the bearing brackets (1, 2) exhibit a resilient contact tongue (27, 28), which are arranged in the region of the bearing sleeves (7, 8) that are formed with flat sides (10, 11), and which lie with prestress against one of the flat sides (10, 11) in a position of the flap (3) that closes the recess (4), as well as in a deployed open position of the flap (3).

13. Device according to claim 8, characterized in that each bearing bracket (1, 2) exhibits two journals (15, 16) that are opposite each other and point away from each other.

14. Device according to claim 4, characterized in that each bearing bracket (1, 2) exhibits two journals (15, 16) that are opposite each other and point away from each other.

15. Device according to claim 5, characterized in that each bearing bracket (1, 2) exhibits two journals (15, 16) that are opposite each other and point away from each other.

16. Device according to claim 10, characterized in that each bearing bracket (1, 2) exhibits two journals (15, 16) that are opposite each other and point away from each other.

17. Device according to claim 8, characterized in that formed on the flap (3) for each bearing sleeve (7, 8) is a protective web (13, 14), whereby the protective webs (13, 14) are arranged on the side of the particular bearing sleeve (7, 8) facing the exit side of the journals (15, 16) and surround the end of the journals (15, 16) at least in sections.

18. Device according to claim 4, characterized in that formed on the flap (3) for each bearing sleeve (7, 8) is a protective web (13, 14), whereby the protective webs (13, 14) are arranged on the side of the particular bearing sleeve (7, 8) facing the exit side of the journals (15, 16) and surround the end of the journals (15, 16) at least in sections.

19. Device according to claim 5, characterized in that formed on the flap (3) for each bearing sleeve (7, 8) is a protective web (13, 14), whereby the protective webs (13, 14) are arranged on the side of the particular bearing sleeve (7, 8) facing the exit side of the journals (15, 16) and surround the end of the journals (15, 16) at least in sections.

20. Device according to claim 6, characterized in that formed on the flap (3) for each bearing sleeve (7, 8) is a protective web (13, 14), whereby the protective webs (13, 14) are arranged on the side of the particular bearing sleeve (7, 8) facing the exit side of the journals (15, 16) and surround the end of the journals (15, 16) at least in sections.

\* \* \* \* \*